(12) United States Patent
Hatanaka et al.

(10) Patent No.: US 6,473,255 B2
(45) Date of Patent: Oct. 29, 2002

(54) INFORMATION STORAGE DEVICE HAVING TRANSDUCERS OPERATING IN A PULSE MODE IN SYNCHRONISM WITH A TIMING CLOCK

(75) Inventors: Noriaki Hatanaka, Chigasaki; Tadahiko Kameyama, Odawara; Takeshi Maeda, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/025,235

(22) Filed: Feb. 18, 1998

(65) Prior Publication Data

US 2001/0015867 A1 Aug. 23, 2001

(30) Foreign Application Priority Data

Feb. 25, 1997 (JP) .......................................... 09-041264

(51) Int. Cl.$^7$ .............................. G11B 5/09; G11B 5/02
(52) U.S. Cl. ............................. 360/51; 360/46; 360/67
(58) Field of Search ............................. 360/51, 46, 67

(56) References Cited

U.S. PATENT DOCUMENTS

| | | | |
|---|---|---|---|
| 3,979,775 A | | 9/1976 | Schwarz ..................... 360/113 |
| 4,627,062 A | | 12/1986 | Bender |
| 5,265,125 A | * | 11/1993 | Ohta ............................ 360/65 |
| 5,434,717 A | * | 7/1995 | Yoshinaga et al. ............ 360/46 |
| 5,517,369 A | | 5/1996 | Takeuchi et al. ............. 360/65 |
| 5,592,413 A | * | 1/1997 | Spitzer ....................... 365/151 |
| 5,828,510 A | * | 10/1998 | Yada et al. ................... 360/51 |
| 5,986,840 A | * | 11/1999 | Tada et al. ................... 360/67 |

OTHER PUBLICATIONS

Hiroaki YADA et al. "External Clocking PRMI, Magnetic Recording Channel for Discrete Track Media" IEICE Trans. Fundamentals, vol. E76–A, No. 7, Jul. 1993, p. 1164–1166.

"New Coinage Dictionary for Information and Communication, '96 Edition", p. 501, Oct. 9, 1995, Nikkei BP.

"Electronics Materials, Nov. '94 Edition", pp. 22–28, Nov. 1, 1994, The Japanese Investigative Association for the Industry.

"Information Processing Handbook", pp. 283–284, May 30, 1989, Ohm.

T. Yamakoshi et al, "The Effect of Non–Linear MR Read-back Distortion on a PRML Channel", IEEE Translation Journal On Magnetics In Japan, vol. 9, No. 3, May/Jun. 1994, pp. 45–51.

"Signal Sampling of Pulse Biased MR Head", IBM Technical Disclosure Bulletin, vol. 19, No. 8, Jan. 1977, pp. 3222–3223.

P. Horowitz et al, "The Art of Electronics", Cambridge University Press, 1980, p. 83.

S.C. Das et al, "Self–Heating Effects on MR Head Performance", International Magnetics Conference, Apr. 17–20, 1990, pp. FP–06 –FP–07.

Y. Murakami et al, "High Density Recording with a Super Resolution Magneto–Optical Disk Using Magnetic Field Modulation Method", Journal Of Physics And Chemistry Solids, vol. 56, No. 11, Nov. 1995, pp. 1535–1541.

* cited by examiner

*Primary Examiner*—Regina N. Holder
(74) *Attorney, Agent, or Firm*—Mattingly, Stanger & Malur, P.C.

(57) ABSTRACT

Sense current is applied in pulses, synchronized with the timing clock generated by a clock generator 5, to transducer 2 in the information storage device, reducing the time-averaged value of the sense current. The recorded information on the magnetic disk medium 1 is reproduced by the MR head as reproducing signal pulses in synchronism with the above timing clock. The amplitude of the reproducing signal pulses are proportional to the magnetic field of the magnetic disk medium 1. The reproducing signal pulses are sample-held by a sample-hold circuit 6, and after being digitized by an A/D converter 7, recorded data are retrieved through a demodulator circuit 8 of a partial-response system.

5 Claims, 6 Drawing Sheets

INFORMATION STORAGE DEVICE HAVING TRANSDUCERS OPERATING IN A PULSE MODE IN SYNCHRONISM WITH A TIMING CLOCK

FIELD OF THE INVENTION

The present invention relates to information storage devices such as magnetic disk storage devices, optical disk storage devices, or magneto-optical disk storage devices. In particular, the present invention relates to a technology that is usefully applied to information storage devices which utilize magneto-resistive heads or optical heads.

BACKGROUND OF THE INVENTION

Due to the recent increase in the amount of data processed by information storage devices, there is an increase in the requirements for larger storage capacity and faster transfer rate of these devices. At the same time, there is an increase in the need for smaller size devices due to the growth of portable information processing systems.

An increase in the storage capacity of information storage devices can be realized by increasing the information recording density on the recording media. However, increase in recording density causes a decrease in the output of the transducer for reading-out the information, thereby resulting in a deteriorating signal-to-noise ratio (S/N ratio).

A partial-response system (PR equalizing system) is known as a method for compensating for the deterioration in S/N ratio of the transducer output, as mentioned in "New Coinage Dictionary for Information and Communication, '96 edition", p501 (Oct. 9. '95, Nikkei BP, in Japanese). The PR equalizing system is a system in which the signal is retrieved by causing some regular interference to the detected waveform. This way, data can be recorded/reproduced in narrower bandwidth than in the conventional sample detecting system. In particular, the PRML (Partial-Response Maximum Likelihood) system combined with the Viterbi decoding system in which the most likely correct data sequence is chosen from a data sequence being made correlative in advance, results in an effective method for compensating for the deterioration of S/N ratio as the data error rate is minimized.

Magneto-resistive (MR) heads which are furnished without coils for recording/reproducing have recently been adopted in magnetic recording systems as explained, for example, in "Electronic Materials, Nov.'94 edition", p22–28 (Nov. 1. '94, The Japanese Investigative Association for the Industry, in Japanese). The MR head is peculiar in that its output has no dependency on the relative velocity of the recording media because the MR head is a magnetic flux response type where reproducing noise is not generated due to absence of coils. This results in improved S/N ratio, high sensitivity signal detection, and high correspondence for high frequency recording due to its low inductance. Thus, such a transducer is suitable for high density recording and high speed reproducing. Moreover, the MR head can be easily combined with the PRML system as described in "Electronic Materials, Nov. '94 edition", p22–28, mentioned above. This combination of the above-mentioned two technologies makes it promising to obtain a magnetic disk storage with higher capacity and smaller size.

On the other hand, with respect to a system in which information is optically read-out from the recording media, optical heads in which laser diodes are used as a light source are used as reproducing transducers, as explained in "Information Processing Handbook", pp283–284 (May 30, 1989, Ohm, in Japanese), for example. The optical head reads out recorded data by irradiating laser light on the recording media.

The MR head in principle requires sense current, because information on the recording media is detected as change of resistance in the MR head. The sense current is continuously applied in a DC mode at least during the reproduction of recorded data, as explained in above mentioned "Electronic Materials, Nov. '94 edition", p22–28 or p35–40. The laser diode, used as a light source, also emits light continuously in a DC mode, as explained in above mentioned "Information Processing Handbook", pp283–284.

SUMMARY OF THE INVENTION

As mentioned above, the MR head sense current and driving current for the laser diode in the optical head are supplied in a DC mode. The present inventors have recognized that this might cause deterioration or lifetime problems in the transducers. In the conventional signal processing technology in which PRML system is combined with signal detection, the analog value of the transducer output is sampled and processed in a suitable way for the PRML system, and so, a time-continuous value is required for the transducer output. Because the transducers, such as MR head or optical head, are active elements, sense current of the MR head or driving current for the laser diode in the optical head is required. For this reason, DC current supply for sense current of the MR head or for driving current to the laser diode is indispensable, inevitably causing an electrical migration in the MR head or the laser diode. Thus, deterioration and lifetime problems may arise due to this electrical migration.

In order to meet the demand for higher information recording density, it is necessary to optimize the trade-offs between the recording density and detecting sensitivity of the transducer. While the increase in sense-current of the MR head or driving current to the laser diode may improve detecting sensitivity, it may not only increase the electrical migration, but may also cause severe deterioration of the transducers due to thermal effect caused by increase in power consumption. This could result in an even further shortened lifetime.

Accordingly, a purpose of the present invention is to prevent deterioration of the transducers such as MR heads or optical heads and to lengthen their lifetime.

Another purpose of the present invention is to improve sensitivity of the transducers such as MR heads or optical heads, without shortening their lifetime.

Yet another purpose of the present invention is to provide a technology to meet the competing needs of increased storage capacity and smaller size through increasing the recording density on the recording media by increasing in sensitivity of the transducers.

The information storage device of the present invention includes information recording media on which modulated signals that are modulated in a specified rule of data used in the information processing unit are recorded, transducers which detect the modulated signals from the information recording media, converters which convert output signals from the transducers to digital values, and a demodulator which retrieves data from digital values. This information storage device is equipped with a clock generator that generates one or a plural number of timing clocks synchronized with each sampling period for converting output signals to digital values. The transducers operate in an pulse mode in synchronism with the timing clocks.

In such an information storage device, which is equipped with a clock generator that generates one or a plural number of timing clocks in synchronism with each sampling period for converting output signals to digital values, and the transducers operate in an pulse mode in synchronism with the timing clocks, driving current to drive the transducers such as the sense current or laser current is not applied to the transducers in a DC mode but applied only during the period of operating in a pulse mode in synchronism with the timing clock. Therefore, average of the driving current is reduced, resulting in suppression of electrical migration due to the driving current, thereby extending the lifetime of the transducers and improving the reliability of the information storage device.

Since the average of the driving current is decreased to increase the transducer lifetime, the instantaneous driving current, that is applied during the period of operating in a pulse mode, can be increased. Increase of instantaneous driving current does not bring increase in power consumption of the transducer if the width of said pulse is kept small, thereby preventing shortening of lifetime of the transducer due to thermal deterioration. At the same time, the increase of instantaneous driving current, improves transducer sensitivity, resulting in improved recording density on the recording media in order to realize larger storage capacity and smaller size for the information storage device. In other words, it is possible to increase transducer sensitivity without the accompanying deterioration or shortening of the lifetime of the transducers. Accordingly, the present invention can realize a device with a larger storage capacity along and a smaller size.

The timing clock, which is in synchronism with the sampling period, can be not only one but a plural number for every sampling period. By using-a plural number of timing clocks for every sampling period, a plural number of sampled values can be obtained. By applying a technology such as a digital filter to obtain a plural number of sampled values, reliability of measured values can be improved.

The transducer mentioned above can be a magneto-resistive head or an optical head including a laser diode as a light source. In response to the requirement for a smaller sized magneto-resistive head or optical head, such elements tends to be unstable against heat. Accordingly, the present invention may be of great consequence. The applied current is a sense current for the case of a magneto-resistive head and is a driving current for the case of a laser diode in the optical head. Magneto-resistive heads as mentioned herein include MR heads and GMR (Giant Magneto-Resistive) heads in which the GMR head effect is applied. Moreover, the transducer is not limited to a MR head or an optical head but can be any active element that requires driving current or driving voltage.

Moreover, the data decoding system in the present invention can be a partial-response system. In a partial-response system, the output signal of the transducer is sampled in synchronism with the clock period. This means that the output signal is utilized only at the instant of sampling, and by synchronizing the driving current for the transducer in the present invention with the clock period for the partial-response system, a sampled signal can be obtained similarly to the conventional case where the transducer output having a time-continuous value is sampled. More specifically, the transducer output of the present invention can be sample-held through a sample-hold circuit, or the like, and then can be inputted to a conventional partial-response demodulator circuit. This way, smaller power consumption and longer lifetime of the transducer are obtained without remarkable design change. Moreover, the partial-response system is a system suitable for high recording density and so fits the purpose of present invention. Incidentally, the PRML system is a commonly applied system for which LSIs are abundantly supplied and is suitable for application to the present invention.

These and other objects, features and advantages of the present invention will become more apparent in view of the following detailed description of the preferred embodiments in conjunction with the drawings.

BRIEF DESCRIPTION OF THE DRAWINGS

FIGS. 2(a) through 2(f) are waveforms corresponding to blocks in FIG. 1, where

DETAILED DESCRIPTION OF THE PREFERRED EMBODIMENTS

Embodiments of the present invention will now be explained in detail in conjunction with the drawings.

Figure 1:
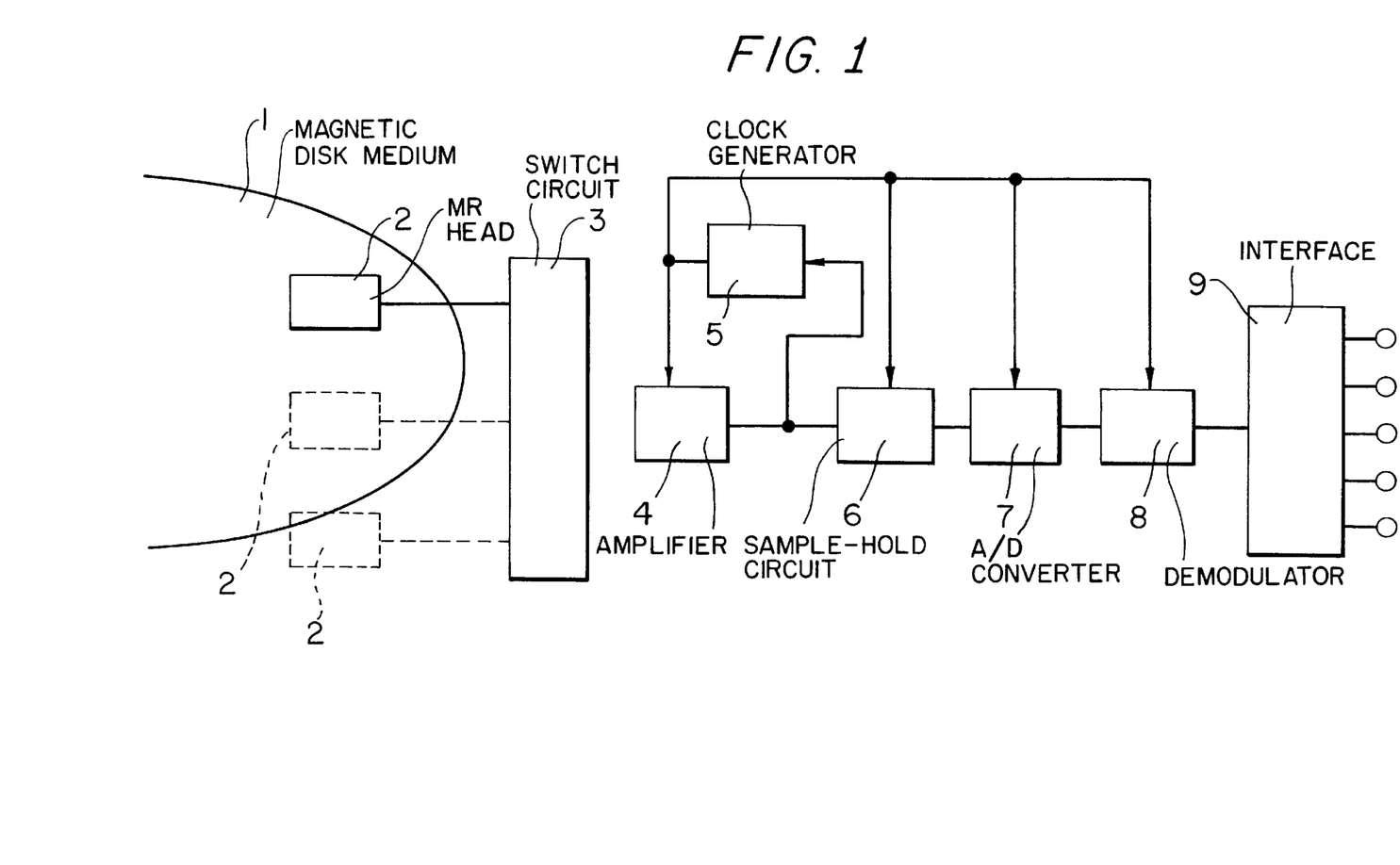
FIG. 1 is a block diagram exemplifying a composition of the main portion of the magnetic disk storage device according to an embodiment of the present invention.
Figure 2A:
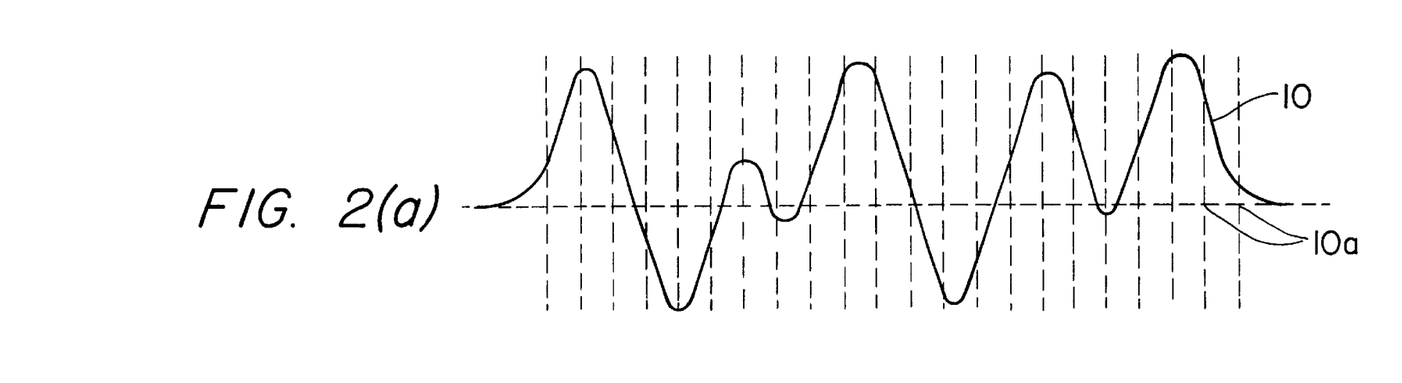
FIG. 2(a) shows the magnetic field waveform at the magnetic disk medium surface.
Figure 2B:
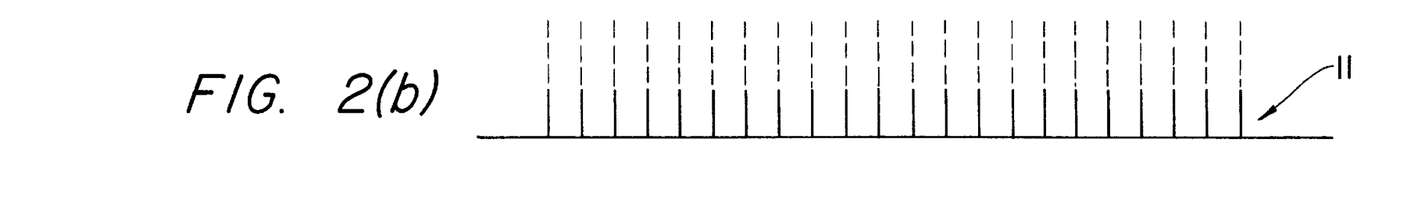
FIG. 2(b) shows a graph for a pulse train obtained from the clock generator.
Figure 2C:
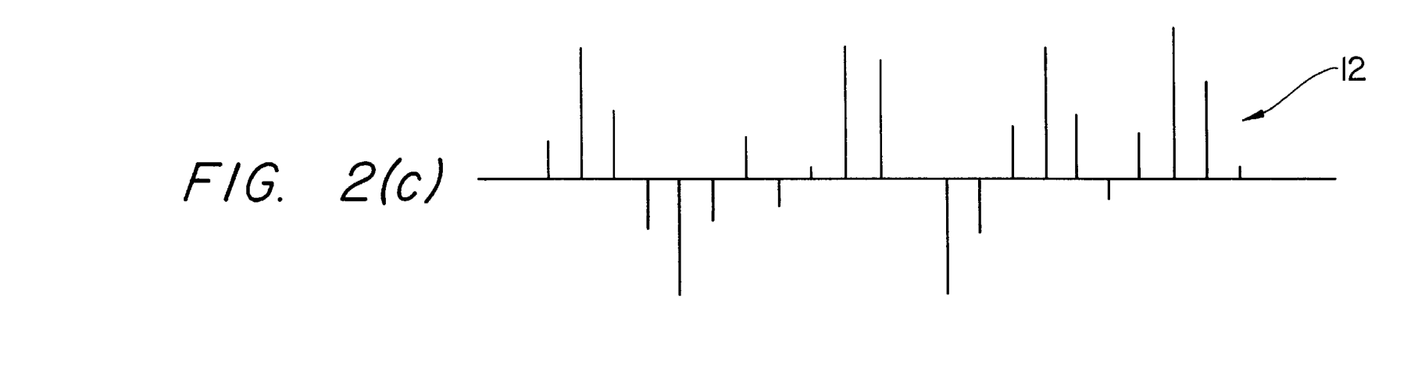
FIG. 2(c) is a pulse train, where each pulse varies its amplitude according to magnetic field strength applied to the magneto-resistive head.
Figure 2D:
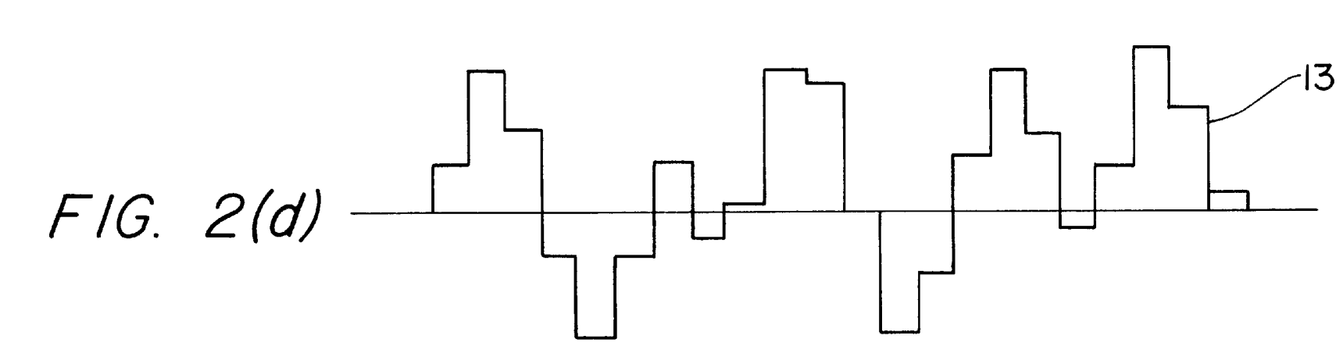
FIG. 2(d) shows a sample-held reproducing signal.
Figure 2E:
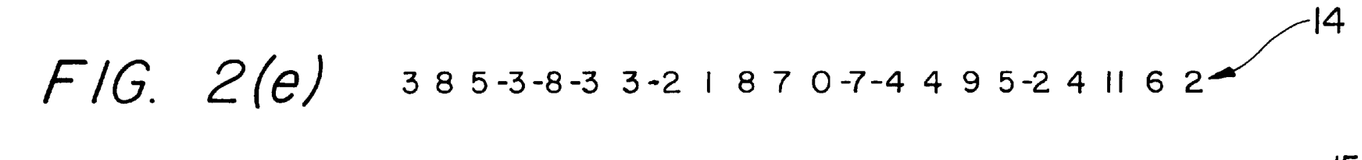
FIG. 2(e) shows digital data of a reproducing signal.
Figure 2F:
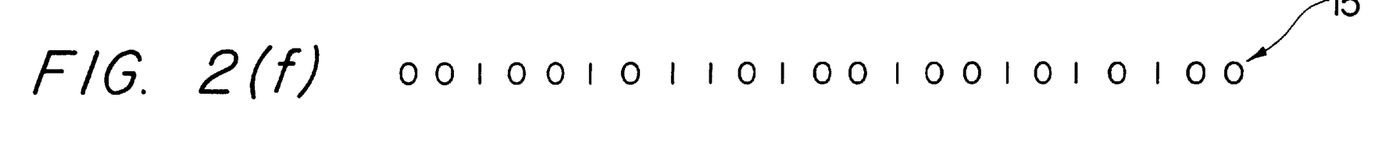
FIG. 2(f) shows recorded data retrieved by the process through the partial-response system.

FIG. 1 is a block diagram of a magnetic disk storage device according to an embodiment of the present invention. FIGS. 2(a)–2(f) show signal waveforms or graphs of numerical values at various points in the magnetic disk storage device of FIG. 1. FIG. 2(a) shows the magnetic field waveform at the magnetic disk medium surface. FIG. 2(b) is a graph of a pulse train obtained from the clock generator. FIG. 2(c) is a pulse train where each pulse varies its amplitude according to the magnetic field strength applied to the magneto-resistive head. FIG. 2(d) shows a sample-held reproducing signal. FIG. 2(e) shows digital data of a reproducing signal. FIG. 2(f) shows recorded data retrieved using the partial-response system.

In FIG. 1, the magnetic disk storage device has a magnetic disk medium 1 that stores information, MR (magneto-resistive) heads 2, a switch circuit 3 that selects one of the MR heads, an amplifier 4 that amplifies the output of the MR heads 2, a clock generator 5, a sample-hold circuit 6, A/D converter 7, a demodulator 8 that retrieves data employing the partial-response system, and an interface 9. In this embodiment, known partial-response recording systems can be used.

Information modified to the partial-response system that is recorded on disk medium 1 through the above mentioned information recording system is recorded as a pattern of magnetic reversals. FIG. 2(a) shows magnetic field waveform 10 applied from the magnetic disk medium 1 to the MR head 2. Information points 10a at which peaks exist indicate the presence of magnetic reversals whereas information points 10a where no magnetic reversals exist are shown as a monotonously increasing or monotonously decreasing waveform.

The MR head 2 is an element in which resistance varies in response to the magnetic field generated on the surface of the magnetic disk medium 1. MR head 2 detects magnetic field as a voltage change (if the sense current is a constant current) corresponding to magnetic field strength by applying the sense current. The sense current in the embodiment, however, is not applied in a DC mode but is applied as a pulse current that is synchronized with the pulse train 11 established by the clock generator 5, as shown in FIG. 2(b). MR head 2 measures magnetic field strength on the surface of the magnetic disk medium 1 at the moment the sense current pulse is applied to the MR head using the pulse train 11 as a timing clock.

Accordingly, the output voltage that is passed through the switch circuit 3 and amplified by the amplifier 4, forms a reproduced signal pulse train 12 whose amplitude is proportional to the magnetic field strength at the moment the pulse current is applied as shown in FIG. 2(c). That is, the reproduced signal pulse train 12 appears as it would if the magnetic field waveform 10 is sampled by the pulse train 11.

The amplifier 4 amplifies the output of MR head 2 and also preferably includes the sense current supplying circuit that generates the current applied to MR head 2. The sense current supplying circuit and amplifier circuit will be explained later.

The clock generator 5 which generates the pulse train 11 by feeding back the detected reproducing signal pulse train 12, generates pulses coincident with the timing of the information points 10a of the reproducing signal. The method of controlling the frequency or phase of the pulse train 11 can be a conventional, publicly known method used with the magnetic disk storage device adopting a partial-response system.

The sample-hold circuit 6 holds the pulse amplitude from each pulse point of the reproducing signal pulse train 12 to the next pulse point, and thus, the signal passing through the sample-hold circuit 6 is a reproducing signal 13 shown in FIG. 2(d). The A/D converter 7 is a circuit that converts the sample-held reproducing signal 13 to digital data 14 as shown in FIG. 2(e). The demodulator 8 is a processing circuit that retrieves the original recorded data 15 as shown in FIG. 2(f) that can be treated in an information processing system, from the digitized data 14, by using a partial-response system. The interface 9 is an interface circuit that transfers the recorded data 15 to another portion of the system. The pulse train 11 can be utilized as a clock to control timing for the sample-hold circuit 6, the A/D converter 7 and the demodulator circuit 8.

Figure 3:
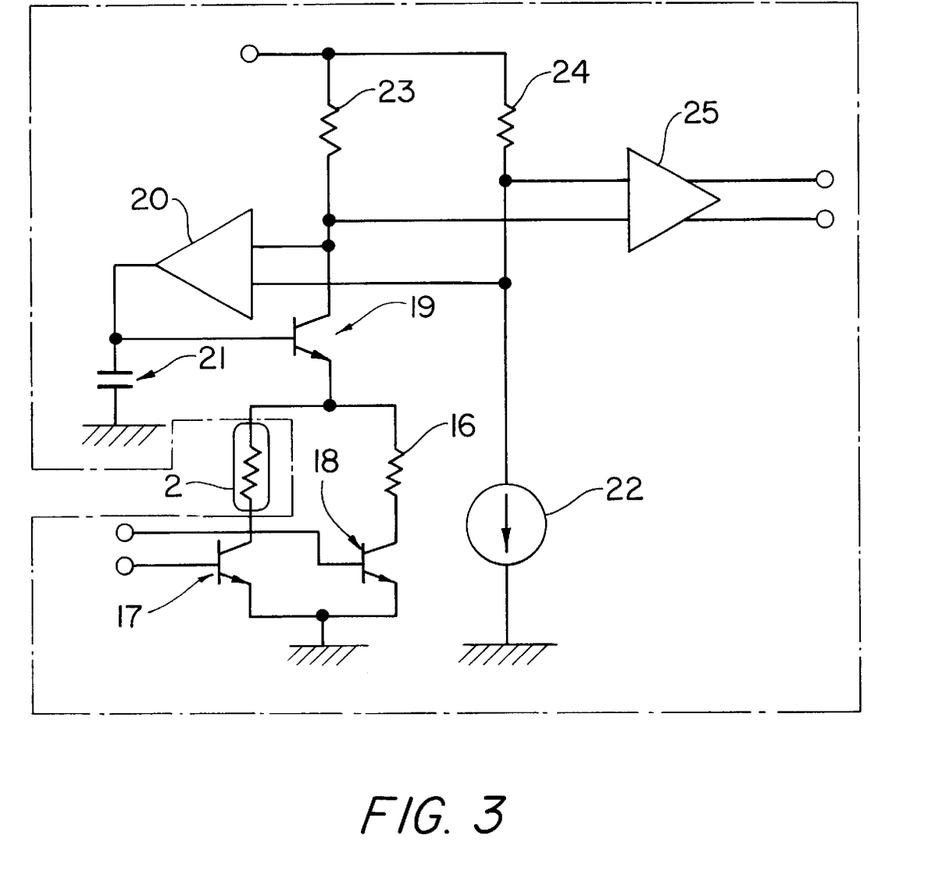
FIG. 3 is a circuit diagram exemplifying an amplifier used in an embodiment of the present invention.

An amplifier according to an embodiment of the present invention will now be described in conjunction with FIG. 3. MR head 2, illustrated as a resister element, is connected in parallel with a dummy resister 16 whose resistance is almost the same as that of MR head 2. MR head 2 and dummy resister 16 are connected to transistors 17 and 18, respectively, which act as current switch transistors. Both emitters of current switch transistors 17 and 18 are grounded. Current switch transistor 17 is turned on only when timing clock pulse train 11 is applied to the base of transistor 17 and conversely current switch transistor 18 is turned off when timing clock pulse train 11 is applied. Thus, current switch transistors 17 and 18 act as a complementary pair.

Transistor 19, which is connected to both MR head 2 and dummy resister 16, supplies a constant current to either the MR head 2 or the dummy resister 16. The output of the differential type operational amplifier 20 controls the base voltage of transistor 19, and capacitor 21 is used to suppress abrupt changes in the output voltage of operational amplifier 20. A constant current circuit 22 generates the reference voltage of the input of the operational amplifier 20, thereby maintaining the sense current that the transistor 19 supplies.

More specifically, assuming that the resistances of resistor 23 and resistor 24 are R and nR, respectively, the requested sense current is $I_{MR}$, and the current of the constant current circuit 22 is $I_{ref}$, then $R \cdot I_{MR}$ is equal to $nR \cdot I_{ref}$. Since the voltages of two inputs of the operational amplifier 20 must be always the same, the equation is reduced to $I_{MR}$ being equal to $n \cdot I_{ref}$ and thus resulting in $I_{MR}$ being kept constant.

When the magnetic field from the magnetic disk medium 1 is applied to the MR head 2 during signal reproducing, a minute change in the MR head 2 causes a resistance change, $\Delta R$. If the resistance of the MR head 2 during idle is $R_{MR}$, the current $I_{MR}$ changes as much as $\Delta I = \Delta R/(R_{MR}+\Delta R) \cdot I_{MR}$ because the abrupt change of the emitter voltage in the transistor 19 is suppressed by the capacitor 21. The change is transferred to the collector of the transistor 19 as a voltage change through the resistor 23. The voltage change is outputted by the differential amplifier 25. Thus, the output voltage of the differential amplifier 25 is kept constant when the current switch transistor 18 is on, and varies in proportion to the magnetic field strength applied to the MR head 2 that is supplied with a sense current when the current switch transistor 17 is on. Accordingly, the voltage change is a pulse train 12 of the reproducing signal as shown in FIG. 2(c).

In the magnetic disk storage device of this embodiment, the sense current is not always supplied to the MR head 2 but supplied only at the moment the pulse train 11 generated by the clock generator 5 is inputted to the base of the current switch transistor 17. Thus the time-averaged value of the sense current supplied to the MR head 2 can be decreased. It is sufficient to know the magnetic field of the magnetic disk medium 1 only at information points boa corresponding to pulse train 11, because the process is accomplished by a partial-response system using pulse train 11 as the timing clock. Consequently, the average sense current supplied to the MR head 2 can be decreased, thereby extending the lifetime of the MR head 2, without sacrificing quality recording and reproducing of information on the magnetic disk medium 1. Furthermore, the instant value of the sense current supplied to the MR head 2 can be increased because of the overall decrease of thermal deterioration due to decreased power consumption in the MR head 2 as a result of decreased average sense current. As a result, the sensitivity of the MR head 2 is increased, resulting in larger recording density, larger storing capacity, and a smaller sized magnetic disk storage device.

The frequency and the phase of the clock generator 5 can be controlled using the reproduced signal pulse train 12, in a manner similar to the use of partial-response processing circuitry of public knowledge. The smaller pulse width of the pulse train 11 used as the clock can more faithfully detect the signal amplitude and is effective in obtaining a MR head of a longer lifetime as the time-averaged value of the sense current can be decreased.

Figure 4:
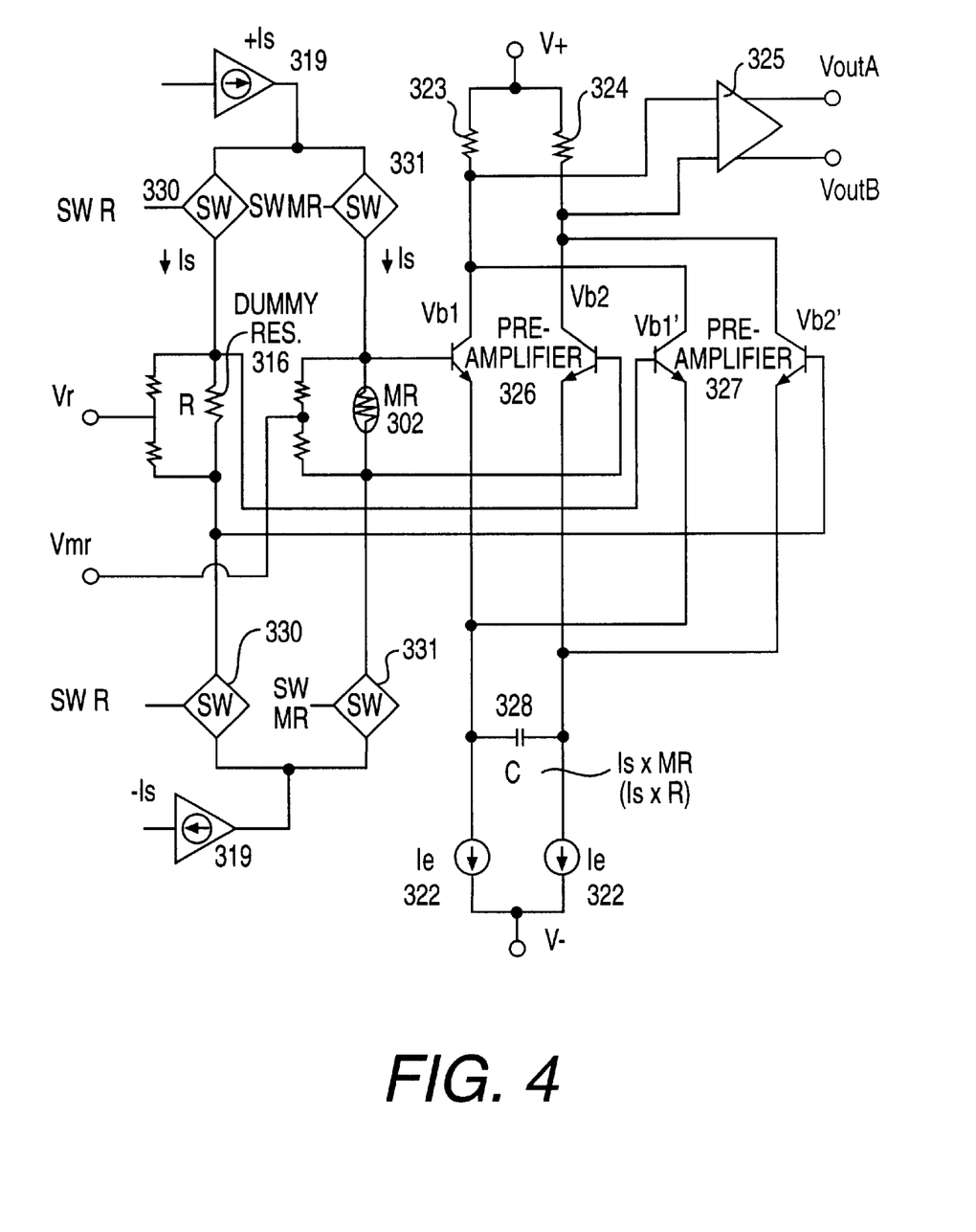
FIG. 4 is a circuit diagram of another embodiment of a constant voltage type amplifier of the present invention including a sense current supplying circuit and an amplifier circuit.

Next, another amplifier 4 including a sense current supplying circuit and an amplifier circuit will be explained in conjunction with FIG. 4. FIG. 4 is a circuit diagram illustrating a constant voltage type amplifier according to another embodiment of the present invention.

In FIG. 4, a MR head 302, shown as a resister element, is connected in parallel with a dummy resister 316 whose resistance is almost the same as that of the MR head. The MR head 302 and the dummy resister 316 are connected by current switches 330 and 331. Current switch 331 is turned on only when timing clock pulse train 11 exists and conversely current switch 330 is turned off when timing clock pulse train 11 exists. In other words, current switches 330 and 331 act as a complementary pair.

The current source 319 is connected to two paths where one path includes switch 331, MR head 302 and switch 331, and the other path includes switch 330, dummy resister 316 and switch 330. The path including dummy resister 316 passes a current from the current source 319 as a bypass when switch 331 is off. The current source 319 supplies a constant current to the MR head 302 or the dummy resister 316.

The differential type pre-amplifier 326 amplifies an alternating current (AC) portion of the output of MR head 302. The capacitor 328 is used to remove a direct current (DC) portion of a product of the current of the current source 319 and the resistance of MR head 302. Preferably, in this embodiment, the capacitor 328 has a value of approximately 0.01 micro-farad or more. The constant current circuits 322 provide bias currents to the twin transistors of the pre-amplifier 326 and pre-amplifier 327. The change of electrical potential at the terminals of resistors 323 and 324 is transferred to the differential amplifier 325.

Figure 5:
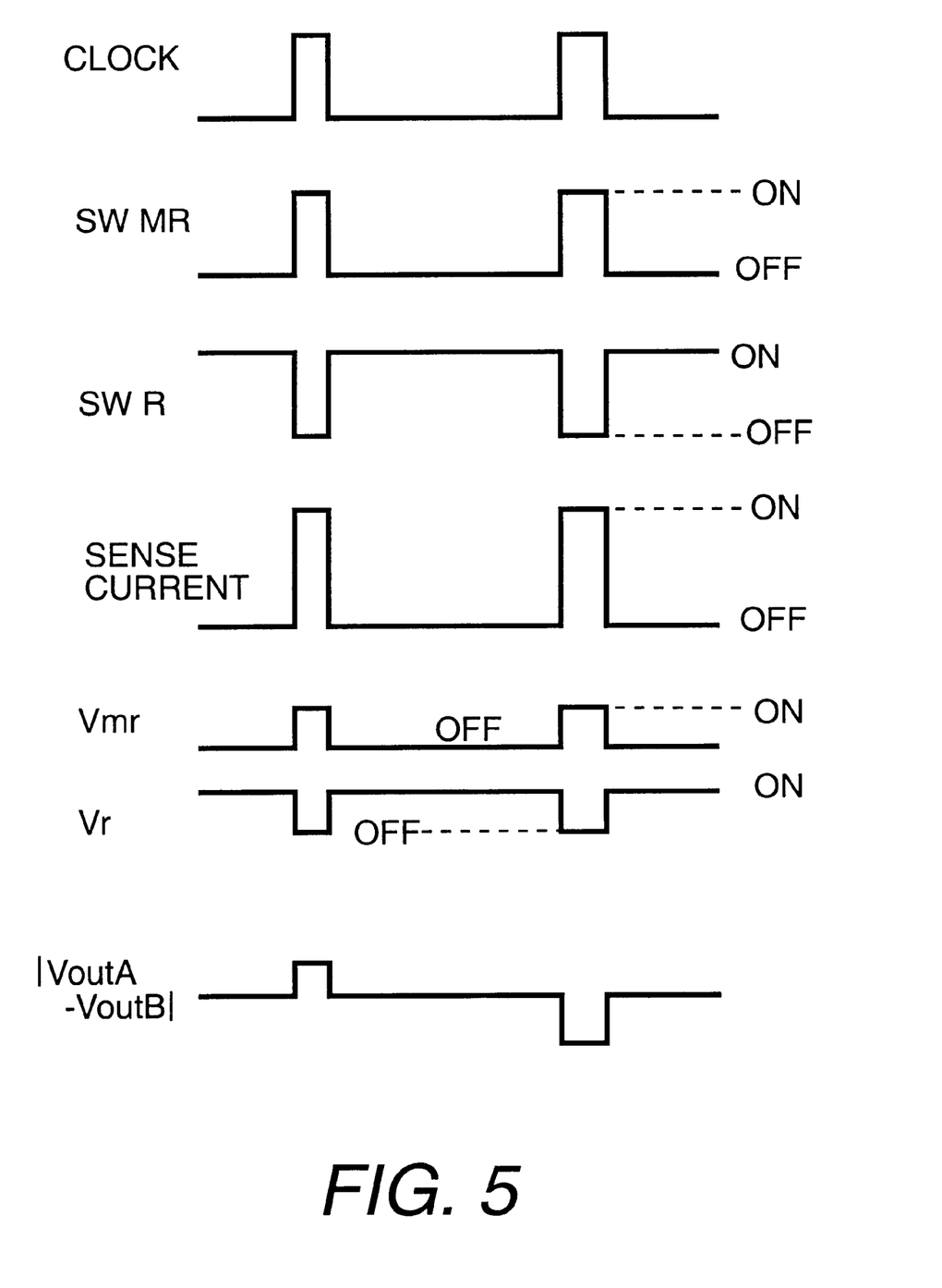
FIG. 5 is a timing diagram illustrating the alternate selection of pre-amplifiers 326 and 327 of FIG. 4, by providing appropriate signals to terminals Vr and Vmr.

One path including switch 331, MR head 302, switch 331, and pre-amplifier 326, is selected when the timing clock pulse train 11 exists. A timing chart is shown in FIG. 5. When timing clock pulse train 11 exists, the differential amplifier 325 outputs signals equal to the absolute value of VoutA−VoutB.

On the other hand, the other path that includes switch 330, dummy resistor 316, switch 330, and pre-amplifier 327, is selected when the timing clock pulse train 11 does not exist. During such time, the differential amplifier 325 does not output any signal because the pre-amplifier 327 does not amplify any alternating current (AC) portion of the output of dummy resister 316.

Generally, an electric current also has inertia. Suddenly cutting the current generates transient phenomena in an electric circuit. The transient phenomena often causes a switching delay in the electric circuit until the current becomes stable. That is the reason the pre-amplifier 326 and 327 are alternatively selected by adding high or low signals to terminals Vr or Vmr as shown in FIG. 5. More specifically in this embodiment, the Vr or Vmr stand between −8 and 0 volt, more preferably they stand between −0.4 volt and 0 volt.

A means for data detection in these embodiments and their compatibility with the means of recording and reproducing in the conventional partial-response system are explained below.

In the means of recording and reproducing in the conventionally practiced partial-response system, after the reproduced waveform obtained as a time-continuous value is amplified, it is sampled by the clock signal and then is converted to a digital data train by an A/D converter. The process after that is the same as that in these embodiments. Consequently, it is obvious that the means in these embodiments can be adopted as data recording and reproducing means of the partial-response system. The main difference from the technology employed in this invention to the conventional technology is that the reproducing signal waveform is digitized at the stage of the reproducing transducer which is at an earlier stage than in the conventional technology.

Another difference is that while in the conventional technology an analog type low pass filter is usually provided behind the amplifier to improve signal to noise ratio, use of the low pass filter in the technology in embodiments of the present invention has no effect in improving signal to noise ratio. However, the same result as that obtained by the low pass filter in the conventional technology can be obtained by employing a method discussed below.

In this method, a plural number of clocks for one information point is arranged at even intervals instead of one clock for one information point as in the conventional technology. Thus, power is applied to the MR head several times for one information point. The reproduced signal waveform is A/D converted by a plural number of clocks for one information point, and a digital data train which contains a plural number of digital data for each information point is obtained. A low pass filter function can be realized by applying digital filter technology of public knowledge to the obtained digital data train. Moreover, detection accuracy of the recorded data can be improved because the digital data train containing a plural number of digital data for each information point is directly applied to signal processing of a partial-response system.

While the present invention has been described above along with its preferred embodiments, one of ordinary skill in the art would be enabled by this disclosure to make various modifications to the preferred embodiments and still be within the scope and spirit of the present invention as recited in the appended claims.

For example, although the storage device in the embodiments described above were magnetic disk storage devices, any magnetic storage device can be employed including using tapes or drums as-recording media.

Also, although in the embodiments described above, information that is magnetically reproduced was discussed, the present invention can be embodied on an optical information storage device that optically reproduces information such as an optical disk, a magneto-optical disk, etc. In the optical information storage device, a laser diode is used as a light source and an optical transducer such as a photo-diode is used for signal detection. In order to obtain the same effect as in the embodiments described above according to the present invention, employing some means for the laser diode to emit pulses using data clock timing is effective. On the other hand, although the signal detecting element and the reproducing circuit are independent from the energizing circuit for the laser diode, the signal appearing at the signal detecting element forms a pulse train in which the amplitude varies in proportion to the detected signal strength for each clock timing. As such, the signal waveform resembles that of the above-described embodiments. Thus, a similar signal processing circuit to the above-described embodiments can be adopted for the optical information storage device.

The present invention provides numerous advantages including the following:

(1) Deterioration of the transducers such as the MR head, the optical head, etc. can be prevented, thereby increasing their lifetimes;

(2) The sensitivity of the transducers such as the MR head, the optical head, etc., can be improved without shortening their lifetime; and (3) The requirement for larger storage capacity and smaller size of the information storage device is satisfied by an improvement in the recording density of the recording media through an improvement in the transducer sensitivity.

What is claimed is:

1. An information storage device comprising:

information recording media on which signals modulated by a specified rule are recorded;

a magneto-resistive head which detects said modulated signals from said information recording media;

a converter which converts output signals from said magneto-resistive head to digital values;

a demodulator which employs a partial-response system for retrieving data from said digital values;

an amplifier supplying a sense current, based on a pulse train to said magneto-resistive head or a dummy resister whose resistance is almost the same as that of said magneto-resistive head, and a clock generator that generates said pulse train in synchronism with a clock used for said partial-response system, supplies said pulse train to said amplifier, and drives said amplifier to generate a pulsed sense current for said magneto-resistive head, and wherein said magneto-resistive head detects signals using said pulsed sense current in synchronism with said partial-response system.

2. The information storage device according to claim 1, wherein said switching between supplying a sense current to said magneto-resistive head or to said dummy resistor head or to said dummy resistor is accomplished using transistors.

3. The information storage device according to claim 1, wherein said amplifier further comprises:

a pair of switches, each of which receives said pulse train from said clock generator, and one of said switches is connected to said magento-restrictive head and the other of said switches is connected to said dummy resistor.

4. The information storage device according to claim 2, wherein the pair of switches are transistors.

5. The information storage device according to claim 1, wherein said clock generator generates said pulse train so that pulses of said pulse train are several times as many as pulses of said clock used for said partial response system, and that some pulses of said pulse train are in synchronism with said clock used for said partial response system.

* * * * *